United States Patent [19]

Huston et al.

[11] Patent Number: 6,123,887
[45] Date of Patent: Sep. 26, 2000

[54] PROCESS FOR PREPARING REGENERATED CELLULOSE ARTICLE

[75] Inventors: Rima Huston; Philippe Esnault; Jean-Paul Meraldi, all of Zurich, Switzerland

[73] Assignee: Michelin Recherche et Technique, Granges-Pacot, Switzerland

[21] Appl. No.: 09/175,277

[22] Filed: Oct. 20, 1998

Related U.S. Application Data

[62] Division of application No. 08/525,712, filed as application No. PCT/CH95/00014, Jan. 24, 1995, Pat. No. 5,880,278.

[30] Foreign Application Priority Data

Jan. 26, 1994 [FR] France .................................. 94 01098

[51] Int. Cl.$^7$ .............................. D01D 5/10; B29C 47/88
[52] U.S. Cl. ................................ 264/178 R; 264/177.11; 264/177.18; 264/177.19; 264/211.6; 516/106; 536/57
[58] Field of Search ....................... 516/106; 264/177.11, 264/177.18, 177.19, 178 R, 211.16, 540; 536/57

[56] References Cited

U.S. PATENT DOCUMENTS

| | | | |
|---|---|---|---|
| 2,574,210 | 11/1951 | Guardiola-Aragonès | 516/106 X |
| 4,543,221 | 9/1985 | Chen et al. | 264/177.11 X |
| 4,590,107 | 5/1986 | Bridgeford | 516/106 X |
| 4,839,113 | 6/1989 | Villaine et al. | 264/211.16 X |
| 4,926,920 | 5/1990 | Gouttebessis et al. | 152/548 |
| 5,011,644 | 4/1991 | Haruta et al. | 264/211.16 X |
| 5,047,180 | 9/1991 | Steiner et al. | 264/5 |
| 5,880,278 | 3/1999 | Huston et al. | 536/67 |

FOREIGN PATENT DOCUMENTS 0 112 507   9/1981   Japan ................................ 264/177.11

*Primary Examiner*—Richard D. Lovering
*Attorney, Agent, or Firm*—BakerBotts, LLP

[57] ABSTRACT

A composition containing cellulose formate and a solvent system. At a temperature at least equal to a value $T_f$ the composition is a solution, and at a temperature appreciably less than $T_f$ the composition is an elastic, thermoreversible gel.

A process for preparing a regenerated cellulose article by the transformation of this composition. Gel spinning in order to obtain a fibre or a film. A regenerated cellulose fibre having an excellent resistance to fibrillation in particular, wherein the said fibre may be a monofilament fibre.

These fibres or these films may be used in textile applications or in technical applications, for example for reinforcing other articles, particularly tires.

17 Claims, 1 Drawing Sheet

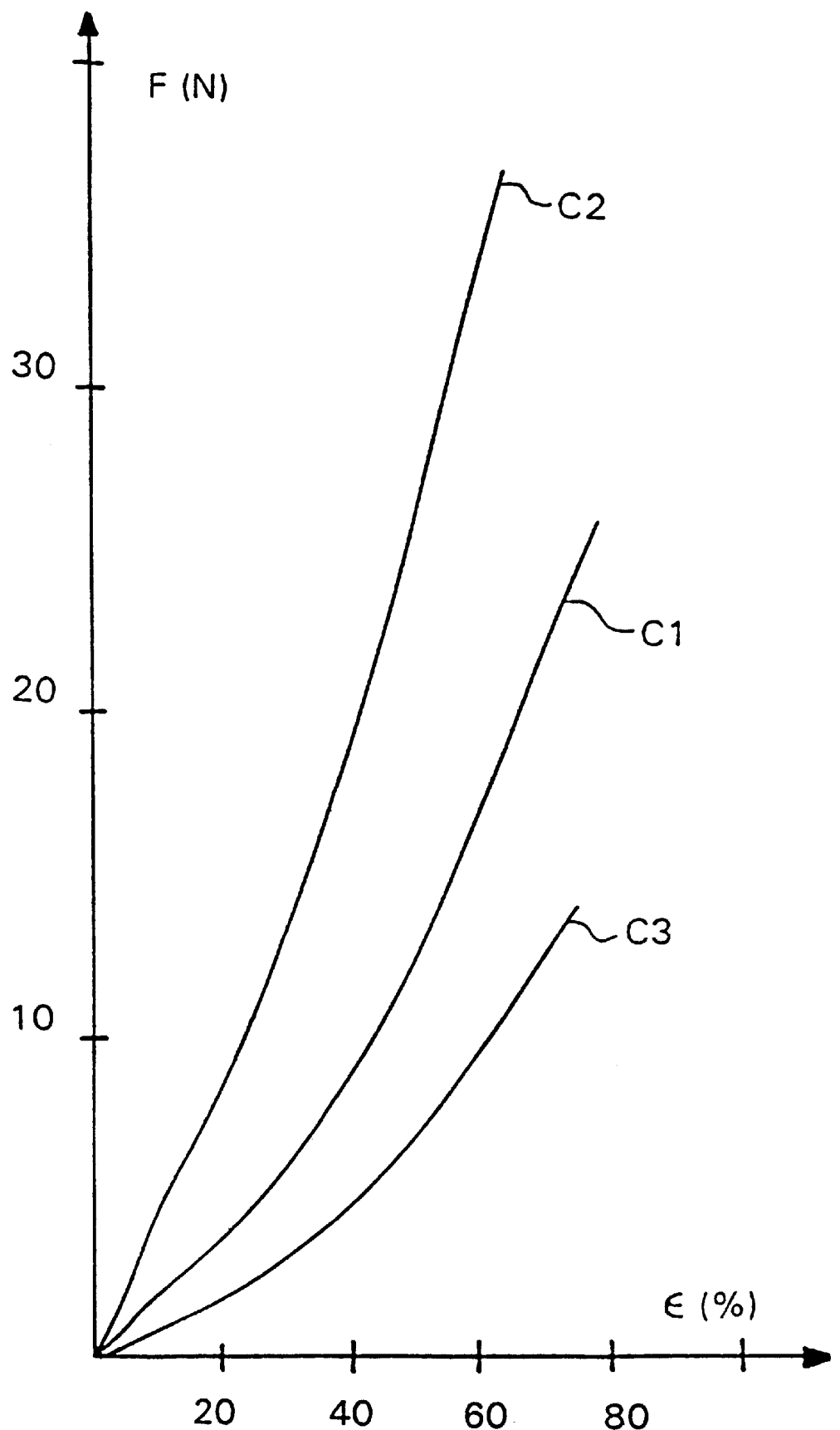

PROCESS FOR PREPARING REGENERATED CELLULOSE ARTICLE

CROSS-REFERENCE TO RELATED APPLICATIONS

The present application is a divisional of allowed application Ser. No. 08/525,712 filed Sep. 21, 1995, and now U.S. Pat. No. 5,880,278 which in turn, is a 371 of PCT/95/00014 filed Jan. 24, 1995, which claims priority from French Application No. 94/01098 filed Jan. 26, 1994.

BACKGROUND OF THE INVENTION

This invention relates to compositions for obtaining regenerated cellulose articles, particularly fibres or films, to processes for obtaining these articles, and to the cellulose fibres themselves.

The production of viscose and rayon fibres by a wet process has been known for a very long time, in which the formation of the fibre in the coagulation bath is accomplished by coagulation resulting from the dehydrating action of a solution of electrolytes and extraction of the solvent (see "Cellulose Chemistry and its Applications", Ed. T. P. Nevell and S. H. Zeronian, Ellis Horwood Limited, 1985, Chapter 18; and "Physics and Chemistry of Cellulose Fibers" by P. H. Hermans, Elsevier. 1949, Part 3, for example). This process employs a succession of complex steps which have characteristics which are significant as regards pollution.

Various processes have been described aimed at remedying this pollution disadvantage; these are summarised below.

It has been proposed that cellulose be dissolved directly in tertiary amine N-oxides, particularly N-methylmorpholine N-oxide, as described for example in the patents U.S. Pat. No. 4,416,698, U.S. Pat. No. 4,734,239, and DD 298 653. These solvents have the property of decomposing readily, forming peroxides which can lead to explosions and cause degradation of the cellulose. Moreover, the fibres resulting from this process exhibit a marked tendency to fibrillation.

It is known that cellulose fibres can be prepared by dissolving cellulose in a mixture of N,N-dimethylacetamide (DMAC) and LiCl, as described for example in U.S. Pat. No. 4,302,252 and in European Patent Application EP-A-178 293, but this process necessitates prior activation of the cellulose.

Japanese Patent Applications JP-A-60/199 912 and JP-A-60/209 006 describe the production of fibres by employing solutions of cellulose in organic solvents containing halogenated tetraalkylammonium compounds. This process does not permit a concentration of 6% by weight of dissolved cellulose to be exceeded.

Patent Application WO-A-85/05115 and the equivalent patents EP-B-179822 and U.S. Pat. No. 4,839,113 describe the production of cellulose formate fibres from anisotropic solutions of cellulose formate in formic acid and 99% crystalline phosphoric acid, wherein these fibres can be regenerated. The process for obtaining fibres is non-polluting, and the regenerated cellulose fibres thus obtained are characterised by very high mechanical property values; the initial modulus and the tenacity in particular have high values. However, the fibres obtained in this manner have a very ordered structure and a particular morphology which reflect the anisotropic character of the starting solutions, which makes them unsuitable for textile use.

Patent Application WO-A-94/17136 describes regenerated cellulose fibres which are obtained from isotropic solutions of cellulose formate in suitable solvents. The process described in this patent application is non-polluting, and it is very flexible since it enables what are termed "technical" fibres (rayon type) as well as what are termed "textile" fibres (viscose type) to be obtained. The fibres obtained are characterised in particular by a less ordered structure and by a morphology which exhibits greater continuity in the transverse direction compared with the fibres described in WO-A-85105115. However, the values of their elongation at break remain moderate in the majority of cases, which can be troublesome for certain applications, particularly for textile applications.

SUMMARY OF THE INVENTION

The particular object of the present invention is to remedy the aforementioned disadvantages or to limit these disadvantages by proposing a composition comprising a cellulose derivative, a process for obtaining regenerated cellulose articles, particularly fibres or films, from the said composition, and a regenerated cellulose fibre.

The composition according to the invention is characterised by the following points:
  a) it contains cellulose formate and a system, termed "solvent system", capable of dissolving the said formate:
  b) at a temperature at least equal to a value $T_f$, the composition is a solution:
    at a temperature appreciably less than $T_f$, the composition is an elastic, thermoreversible gel.

The process according to the invention for preparing a regenerated cellulose article is characterised by the following points:
  a) the composition defined above is transformed into a liquid object having the shape of the desired article, at a temperature such that the composition is a solution;
  b) the said liquid object is subjected to thermal quenching by rapid cooling of the solution in a medium of gelation, the temperature of which is appreciably less than $T_f$, so as to obtain an elastic, thermoreversible gel;
  c) the article in the form of the said gel is washed to remove the whole or the major part of the solvent system;
  d) the cellulose of the article is regenerated;
  e) the article which is thus regenerated is washed and dried.

The process according to the invention is used in particular in order to obtain a fibre or a film by transformation of the composition, particularly by extrusion, during step a) above, into a liquid object having the form of a fibre or a film.

The regenerated cellulose fibre according to the invention, which consists of at least one filament, is characterised in that it has the following properties:
  a) the degree of substitution of the cellulose by formate groups, denoted by $DS_f$ and expressed in %, complies with the following relationship: $0<DS_f<5$;
  b) the filament has a morphology in cross-section which is practically continuous from the periphery up to the core;
  c) the filament does not fibrillate, or practically does not;
  d) the fibre has an initial modulus at least equal to 500 cN/tex, an elongation at break at least equal to 5% and a tenacity at least equal to 15 cN/tex.

In particular, the fibre according to the invention is a monofilament fibre, the diameter of which is greater than 40 µm, and the titre of which is greater than 2.0 tex.

The present invention also relates to regenerated cellulose articles, particularly fibres and films, obtained by the process according to the invention, and to assemblies comprising at least one fibre and/or one film according to the invention, wherein such assemblies may for example be cables, for example monofilament cables, plied yarns, or multifilament fibres which are twisted on themselves, wherein such articles or assemblies may for example be hybrids or composites, namely comprising elements of a different nature, optionally not according to the present invention.

The articles and/or assemblies according to the invention may be used in particular in packaging (in the food packaging sector, for example), in the textile industry, and also as technical reinforcements, for example for reinforcing articles made of rubber or of plastics materials, particularly belts, hoses or tyres, the present invention relating also to these reinforced articles.

The solvent system is preferably formed from at least one constituent (I) which is an aprotic solvent for cellulose formate and of at least one constituent (II) which is a non-solvent for cellulose formate, the amount of the said non-solvent, or of the totality of the said non-solvents, being at least equal to 10% by weight and at most equal to 40% by weight of the total weight of the solvent system. Advantageously the aprotic solvent constituent is selected from the group (I) comprising alkyl sulphoxides, lactams, acyclic amides, and cyclic derivatives of urea having a methyl substituent on the nitrogen, wherein the lactams and acyclic amides may be substituted or unsubstituted, and the non-solvent constituent is selected from the group (II) comprising water and alcohols.

Examples of compounds of groups (1) include γ-pyrrolidone, N-methylpyrrolidone, N-ethylpyrrolidone, dimethyl sulphoxide, tetramethylene sulphoxide, N,N-dimethylformamide, N,N-dimethylacetamide, N-formylmorpholine, N-formylpyrrolidine, ε-caprolactam, N-methylcaprolactam, N-methylvalerolactam, N-methylformamide, 1,3-dimethyl-2-imidazolidinone, and 1,3-dimethyl-3,4,5,6-tetrahydro-2-pyrimidone. Dimethyl sulphoxide is preferably used.

The alcohols of group (II) may be monofunctional or polyfunctional (comprising at least two functions), preferably containing 2 to 7 carbon atoms in their main chain. Glycerol, ethylene glycol and propylene glycol are preferred.

DESCRIPTION OF DRAWING

The invention can be easily understood with the aid of non-limitative examples given below and with the aid of the single FIGURE which illustrates force-elongation curves of gels obtained using compositions according to the invention.

DESCRIPTION OF PREFERRED EMBODIMENTS

I. Measurements and Tests Used

1. Measurements Made on the Initial Cellulose Formate 1.1 Degree of Polymerisation of the Cellulose in the Form of the Initial Cellulose Formate The cellulose of this cellulose derivative is regenerated by treating this derivative under reflux with normal sodium hydroxide. The cellulose obtained is washed with water and dried, and the degree of polymerisation (denoted by DP) is measured as follows:

The inherent viscosity IV of the cellulose material is measured according to Swiss Standard SNV 195 598 of 1970, but at different concentrations varying between 0.5 and 0.05 g/dl. The inherent viscosity is defined by the equation $$IV=(1/C) \times Ln(t/t_0)$$

where C represents the concentration of dry cellulose material, "t" represents the duration of flow of the dilute polymer solution and $t_0$ represents the duration of flow of the pure solvent, in a viscometer of the Ubbelhode type, and Ln represents the natural logarithm, the measurements being made at 20° C.

The intrinsic viscosity [π] is obtained by extrapolating the inherent viscosity IV to zero concentration.

The average molecular weight $M_w$ is given by the Mark-Houwink relationship: $[\pi]=KM_w^\alpha$; where the constants K and α are respectively: $K=5.31 \times 10^{-4}$; $\alpha=0.78$, these constants corresponding to the solvent system used for the determination of the inherent viscosity.

These values are given by L. Valtasaari in the document Tappi 48 627 (1965).

The degree of polymerisation (DP) is defined by the formula:

$$DP=(M_w)/162.$$

162 being the molecular weight of the elementary structural unit of the cellulose.

1.2 Degree of Substitution of the Initial Cellulose Formate (Degree of Formulation)

400 mg of cellulose formate is accurately weighed out and introduced into an Erlenmeyer type flask. 50 ml of water and 4 ml of normal sodium hydroxide (1 N NaOH) are added. The mixture is heated at 100° C. under reflux for half an hour under nitrogen: the cellulose is thus regenerated from the formate. After cooling, the excess sodium hydroxide is back-titrated with a decinormal solution of hydrochloric acid (0.1 N HCl).

The degree of substitution (denoted by DS) determined by this method gives the total percentage of the number of alcohol functions of the cellulose which have been esterified, i.e. DS=100% when the three alcohol functions of the cellulose structural unit are esterified, and DS=30% when 0.9 alcohol function is esterified.

The DS determined in this manner is a direct measure of the percentage of alcohol functions of the cellulose which have been transformed into formate groups.

2. Measurements Made on the Composition 2.1 Measurement of $T_f$ (Gel Fusion Temperature)

About 5 g of the composition in the form of a solution at a temperature of 100 to 130° C. are poured directly into a glass tube of dimensions 20 mm×10 mm, this tube being at ambient temperature. The solution gels on cooling to ambient temperature and adopts the shape of the tube. The glass tube is closed and is placed inverted in a thermostatically controlled oil bath. The oil bath is heated so that its temperature increases by 2° C. per minute. The temperature at which the sample of gel begins to slide in the tube due to the fusion of the gel at the tube wall is denoted by definition as the fusion temperature. $T_f$. The accuracy of this measurement is of the order of ±3° C. After fusion is complete, the composition may be gelled again by cooling it to a temperature appreciably less than $T_f$, for example to a temperature about 50° C. less than the temperature $T_f$, i.e. the gel is thermoreversible.

2.2 Mechanical Properties of the Gel

The composition in the form of a solution at a temperature of 100 to 130° C. is poured into a mould which is at ambient temperature. The amount poured in is in excess of the amount necessary to fill the mould. The mould is made of stainless steel. Its internal dimensions are 150×150×2.5 mm and its external dimensions are 180×180×7.0 mm.

A cover (a stainless steel plate 180×180×5 mm) is immediately placed on the mould. which enables the excess solution to be removed by pressure. Openings are provided on the sides of the mould to facilitate the removal of the excess solution.

The mould which is covered in this manner is then immediately placed under a press at ambient temperature. A load of 5 kN is applied to the mould to enable the rest of the excess solution to be removed, and brings the cover and the edges of the mould into contact.

The mould is left under load at ambient temperature for 24 hours. During this cooling phase the solution gels. At the end of this 24 hour period a slab of gel of average thickness 2.5 mm is obtained simply by removing it from the mould. The thickness of this slab is measured to $1/10$ th of a mm.

Tensile test pieces are then cut from this slab using a punch termed a Scott test piece punch. The Scott test piece punch has a total length of 127±0.01 mm and a maximum width of 22.7±0.05 mm. The punch has a narrow central portion 25.4 mm long with a constant width of 3.18±0.03 mm. 5 to 6 test pieces per slab are produced in this manner.

The gel test pieces obtained in this manner are then subjected to tensile loading until break on a Type 1445 machine manufactured by Zwick GmbH & Co. (Germany) under the following conditions: pneumatic grips with flat jaws (dimensions 38×50.5 mm) controlled by a pressure of 5 bar, 1 kN cell; length between grips 80 mm: traction rate 500 mm/min; temperature 20° C.; relative humidity 65%. The gel test piece is positioned in the grips under a pretension of about 5 to 20 cN, the narrow part of the test piece being centred in relation to the distance between the grips.

Under these conditions, a force-elongation curve is obtained which is characteristic of the composition in its gel phase. The force is measured in newtons and the elongation in %. The absolute accuracy of the values of the breaking force obtained is of the order of ±6 N on average, and for the values of the elongation at break it is of the order of ±12% on average. The nominal breaking stress of the gel test piece is then calculated from the mean value of the measured breaking force (mean of 5 measurements) and from the mean value of the cross-section of the narrow part of the test piece before testing. This cross-section is defined as the product of the width of the central part of the punch. i.e. 3.18 mm, and the mean value of the thickness of the slab of gel measured after removal from the mould (mean of 6 measurements in mm). The value of the nominal breaking stress is given in MPa.

2.3 Degree of Substitution of the Cellulose Formate in the Composition

The composition in its solution state is cooled to ambient temperature and thus transformed into a gel. The solvent system is extracted from the gel by washing with water at ambient temperature in a dispersion apparatus. After filtering and re-washing with acetone, a powder is obtained which is then dried in a vacuum oven at 40° C. for at least 30 minutes.

200 mg of the cellulose formate obtained in this manner is accurately weighed out and introduced into an Erlenmeyer type flask. 40 ml of water and 2 ml of normal sodium hydroxide (1 N NaOH) are added. The mixture is heated under reflux for 15 minutes under nitrogen. The cellulose is thus regenerated from the formate. After cooling, the excess sodium hydroxide is back-titrated with a decinormal hydrochloric acid solution (0.1 N HCl).

The degree of substitution (denoted by $DS_c$) determined by this method gives the total percentage of the number of alcohol functions of the cellulose which are esterified in the composition, namely $DS_c=100\%$ when the three alcohol functions of the structural unit of the cellulose are esterified, and $DS_c=30\%$ when 0.9 alcohol function is esterified.

The value of $DS_c$ determined in this manner is a direct measure of the percentage of alcohol functions of the cellulose which are converted into formate groups.

3. Measurements Made on the Regenerated Fibres
3.1 Mechanical Properties of the Fibres The term "fibres" is understood here to mean either multifilament fibres, consisting in the known manner of a plurality of elementary filaments of small diameter (low titre), or of monofilament fibres, also termed "monofilaments", consisting of a single filament of large diameter (high titre). In particular, the monofilament fibres according to the invention have a diameter greater than 40 μm and a titre greater than 2.0 tex.

The term "conditioning" is understood to mean the storage of the fibres, before their properties are measured, according to European Standard DIN EN 20139 of September 1992 (use of a standard atmosphere: temperature 20° C.; relative humidity 65%).

The titre of the fibres is determined according to German Standard DIN 53830 of June 1965, the fibres being previously conditioned. The measurement is made on at least three samples, each corresponding to a length of 50 m, by weighing this length of fibre. The titre is expressed in tex (weight in grams of 1000 meters of fibre).

The mechanical properties of the fibres (tenacity, initial modulus, and elongation at break) are measured using a tensile testing machine manufactured by ZWICK GmbH & Co (Germany), Type 1435 or Type 1445 (machines corresponding to German Standards DIN 51220, 51221, and 51223) and, unless indicated otherwise, according to the operating procedure described in German Standard DIN 53834. The fibres are subjected to traction over an initial length of 400 mm (millimeters). Multifilament fibres are subjected to a slight preliminary protective twist (twist corresponding to a helical angle of about 6°). All the results given represent the mean of 10 measurements.

The tenacity (T) and the initial modulus (Mi) are expressed in cN per tex (centinewtons per tex). The elongation at break (Ar) is expressed as a percentage. The initial modulus (Mi) is defined as the slope of the linear portion of the force-elongation curve which is present just after the standard pretension of 0.5 cN/tex. T, Mi and Ar are measured on conditioned fibres.

3.2 Chemical Characteristics of the Fibres

The degree of substitution of the regenerated fibres (denoted by $DS_f$) is determined as follows:

About 400 mg of fibres cut into 2–3 cm pieces and introduced into an Erlenmeyer type flask. 50 ml of water and 1 ml of normal sodium hydroxide (1 N NaOH) are added. The material is mixed at ambient temperature for 15 minutes. The excess sodium hydroxide is titrated with a decinormal solution of hydrochloric acid (0.1 N HCl). The value of $DS_f$, calculated as in paragraph 1.2 for the degree of substitution of the formate starting material (DS), gives the percentage of alcohol functions of the cellulose which remain converted into formate groups after regeneration.

3.3 Morphology of the Fibres

The morphology of the elementary filaments of the fibres investigated can be examined using an optical polarising microscope, the filaments being disposed between the crossed linear analyser and polariser, and the axis of the filaments being parallel to the plane surfaces of the polariser and the analyser. The filaments may also be examined using an electron microscope.

First of all, the filaments are observed in their initial state, i.e. intact. The observation is then pursued by subjecting them in successive steps to progressive abrasion. This abrasive action is effected in a simple manner, for example by rubbing and rasping the surface of the filaments to a greater or lesser extent using an object with no cutting action and of an appropriate size, such as a rubber or an element of a tweezers or spatula.

An analysis of the morphology of the filaments, taken individually, such as this provides information on their lateral cohesion. i.e. on their cohesion in a transverse direction (normal to the axis of the filament).

The fibres are studied here as they stand, in the dry state. They only contain a small proportion of water, which constitutes their residual natural humidity.

3.4 Water Fibrillation Test

The investigation of the capacity of the fibres for fibrillation, or in other words their resistance to fibrillation can be conducted by means of a test termed the "water fibrillation test", which is performed on elementary filaments of theses fibres, swollen in water.

As known, fibrillation is understood to be a partial local superficial loss of cohesion of the filaments considered. This loss of cohesion, which is essentially longitudinal (i.e. along the axis of the filament), occurs due to a mechanical stress comprising rubbing and abrasion of the surface, and it is increased appreciably when this mechanical stress is combined with an additional swelling action in water, as in the present test.

Fibrillation is manifested by the appearing of a greater or lesser number of fibrils on the surface of the filaments, which fibrils have the shape and appearance of very fine hairs, or of very thin ribbons or skins. These fibrils, microfibres or very thin skins have a thickness (a diameter, for example) which is appreciably less than that of the filaments on which they are formed, generally by a factor of at least 10 or 20, and which is less than a micrometer or a tenth of a micrometer for example, and have a limited length, from a few tens to a few hundreds of micrometers for example. It is known that fibrillation of cellulose fibres can vary to a very large extent, depending on their nature and their method of production. In particular, the water fibrillation test can serve to establish a classification between these fibres.

This fibrillation test, which is typically used for cellulose textile fibres, is described in the following reference: I. Marini et al., Chemiefasern/Textilindustrie, 43./95. Jahrgang, November 1993, pp. 879–883.

Eight elementary filaments are cut to a length of 200 mm and then introduced into a 25 ml bottle at ambient temperature together with 4 ml of distilled water. The bottle is then agitated for 24 hours at 200 rpm by means of a Salvis type agitator. The filaments are then dried at ambient temperature and observed under a scanning electron microscope at an magnification of 200 to 2000, depending on the diameter of the filaments (200 for filaments of diameter larger than 40 $\mu$m, for example). The surface condition of the filaments treated in this manner is compared with that of the filaments before the fibrillation test.

As indicated in the above document by I. Marini, a classification may be made between different fibres, based on an overall visual appreciation of the filaments tested, by means of a fibrillation scale consisting of fibrillation scores (or degrees) varying from 0 to 6.

II—Production of Fibres

In all the following examples, the compositions according to the invention are produced by spinning, namely by extrusion through a spinneret, in order to obtain regenerated cellulose articles which either comprise multifilament fibres or monofilament fibres.

1. Production of Cellulose Formate

Cellulose formate is prepared according to the above-mentioned Patent Application WO-A 85/0115. for example, from cellulose, formic acid and 99% crystalline phosphoric acid.

The following operating procedure is employed, for example: cellulose powder (the moisture content of which is in equilibrium with the ambient humidity of the air) is introduced into a jacketed mixer having Z-shaped arms. A mixture of 99% crystalline phosphoric acid and formic acid is then added. The three components are present in the following proportions, for example: 16% cellulose; 51% orthophosphoric acid; 33% formic acid (% by weight).

The whole is mixed for a period of about 2 to 4 hours, the temperature of the mixture being maintained between 10 and 20° C. Under these conditions the degree of polymerisation undergoes a decrease of 20 to 30%. Variation of the relative proportion of formic acid enables the degree of substitution (DS) to be varied. Under these conditions, DS values between 40% and 50% are obtained.

The solution of cellulose formate obtained in this manner is extruded from mixer having Z-shaped arms, by means of an extrusion screw, in the form of rods of liquid of about 0.5 mm diameter which are quenched in cold water (at 10° C. for example). In this manner rods of cellulose formate are obtained, by coagulation and neutral washing, which are dried with hot air. This method is of course merely cited by way of example. Thus rods of much greater fineness, or even coarse fibres in the form of cellulose formate floss, can be obtained, depending on the conditions of extrusion. The production of thin films, by extruding the solution on to the rolls of a calender, for example, is also possible.

2. Production of Spinning Compositions

The cellulose formate compositions according to the invention are obtained by dissolving these rods of dry cellulose formate in the solvent systems studied.

The following mode of operation is employed, for example:

The rods are cut into long segments of about 10 mm. The mixture of constituents forming the solvent system is prepared previously at ambient temperature. The cut rods and the solvent system are introduced into a reactor, at ambient temperature. This reactor comprises a double-shell vessel, an agitator, vacuum connections and nitrogen inlets.

The mixture is then progressively brought to a temperature of 110° C. over a period of about an hour with slight agitation. A degassing phase under partial vacuum may be included in this first step. In a second period, dissolution is continued isothermally at 120° C., with agitation, for about 2 to 3 hours, until a clear, homogeneous solution free from bubbles is obtained. This second phase may be carried out in an inert atmosphere. Of course, this method is merely cited by way of example. The temperatures and durations indicated may vary significantly depending on the mixture investigated and the desired composition.

3. Spinning of the Composition

In the reactor described previously, the composition which is at a temperature greater than $T_f$ (120° C., for example) is in the form of a solution, i.e. in the form of a fluid, homogeneous liquid. This solution is transferred to the spinning unit by applying nitrogen pressure and fed to a spinning pump. From this spinning pump the solution is extruded through a spinneret (preceded by a filter) comprising n extrusion orifices or capillaries (n being equal to 1, 26 or 100 in the examples), of diameter D (50, 100, 300 or 800 micrometers in the examples). The liquid jet which emerges from each orifice acquires an outlet velocity denoted by $V_e$ in Table 2. During its passage from the reactor to the spinneret, the solution is progressively brought to the desired spinning temperature, which is close to the temperature of the spinneret denoted by $T_e$ in Table 2.

The composition is thus converted into a liquid extrudate in the form of a fibre consisting of n liquid jets.

The following step consists of thermally quenching the liquid extrudate obtained in this manner, by rapid cooling, until a get is obtained. This operation, which is termed the "gelation step" is effected by passing the liquid extrudate into a zone termed the "gelation zone" which contains a cooling medium, termed a "medium of gelation" or "gelling medium", which is maintained at a temperature appreciably lower than $T_f$ (at least 50° C. lower, for example).

The spinneret is situated at a distance from a few mm to a few cm (preferably about 10 mm) above the zone of gelation. Spinning is thus effected using the technique termed "with non-coagulant fluid layer" (dry jet wet), wherein the liquid extrudate which emerges from the spinneret traverses a layer of non-coagulant fluid, for example a layer of air, before entering the zone of gelation.

The zone of gelation comprises a medium of gelation, the temperature of which, denoted by $T_b$, varies according to the type of desired fibre, whilst being appreciably less than $T_f$. The temperature $T_b$ is preferably less than ambient temperature, and most preferably less than –10° C. The zone of gelation may consist of a liquid bath, for example, wherein this liquid may be miscible or immiscible with the solvent system. For example, this liquid bath may be a bath of water, or a bath based on water, a bath of organic solvent, or a bath based on organic solvent. Examples of such solvents comprise alcohols, for example methanol or ethanol, alkanes, for example heptane, octane or nonane, ketones, for example acetone or methylethylketone, individually or in admixture.

The medium of gelation is preferably a liquid which is immiscible or quasi-immiscible with the solvent system, wherein this medium may be an alkane for example.

Although less practicable to use when the process according to the invention is employed as described here in order to obtain fibres or films, a cooled gaseous medium could also form the medium of gelation.

In the zone of gelation a cellulose derivative fibre is therefore obtained, by thermal quenching of the spinning composition, in the form of an elastic, thermoreversible gel which is generally transparent.

This gel phase of the composition is characterised by the appearing of an elastic restoring force when the gel is subjected to a low-amplitude drawing. The gel phase consists of a three-dimensional polymeric network swollen in its solvent system, similar to other elastic, thermoreversible gel phases of known polymers, such as polyvinyl alcohol or polyethylene gels.

Since the formation of the fibre in gel form in the zone of gelation is simply the result of a thermal quenching operation, it may be effected without material transfer between the liquid extrudate and the medium of gelation, and in particular without extraction, or without appreciable extraction, of the solvent system of the composition. For this purpose it is sufficient to select a medium of gelation which is immiscible or quasi-immiscible with the solvent system of the composition.

In general terms, the process according to the invention is preferably carried out under conditions of gelation which prevent or minimise material transfer between the liquid extrudate and the medium of gelation.

This step comprising the formation of the fibre by gelation is consequently very different from all the known steps of cellulose fibre formation by spinning, as described for example in the aforementioned patent applications WO-A-85/05115 and WO-A-94/17136. In fact, these known steps consist, in a classical manner, of a coagulation step, the principle of which, on the contrary, is to cause significant extraction of solvent from the fibre during the formation of the latter.

On leaving the zone of gelation, the fibre in the form of a gel formed in this manner is taken up on a first drive device, consisting of rollers for example, the take-up speed of which (the linear drive speed of the fibre), which is denoted by $V_{a1}$, is preferably selected close to $V_e$, without this being necessary, however. The fibre then passes into a succession of washing devices based on an organic solvent, for example an alcohol such as methanol, or based on water, in order to extract and eliminate the solvents of the initial composition from the fibre.

On emerging from the washing step, the fibre is taken up on a second drive device, rollers for example, having a take-up speed $V_{a2}$, which may or may not be equal to $V_{a1}$. When $V_{a1}$ and $V_{a2}$ have different values, stretching of the fibre (if $V_{a2} > V_{a1}$) or relaxation of the fibre (if $V_{a2} < V_{a1}$) may occur between the two drive devices.

The use of two drive devices is not limitative; the process according to the invention may employ only one drive device or may employ more than two drive devices. Thus the fibre in the form of a gel may be subjected to a relaxation or stretching step between the zone of gelation and the washing zone, by employing additional drive devices in particular.

The temperature of the washing baths is generally higher than that of the medium of gelation, without this being essential however. The fibre may or may not be dried before being subjected to the regeneration operation.

4. Regeneration of the Cellulose

During the regeneration step, the cellulose formate fibre is immersed for a few seconds in a regeneration bath, which is at ambient temperature for example, this bath consisting of an alkaline solution, for example a sodium hydroxide solution containing 1 to 5% by weight of sodium hydroxide. The fibre which is regenerated in this manner is washed and then dried.

During these various production steps (particularly spinning and regeneration), the fibre may be subjected to drawing operations, both imposed and undergone, which are reflected in the value of the total drawing ratio, denoted by FEF in Table 2.

The total drawing ratio is determined by calculation, starting in the known manner from the value of the titre of the fibre and its degree of substitution measured after regeneration, and from operating parameters of the process and characteristics of the composition. For example, the value of FEF determined in this manner is very close to the ratio $V_{a2}/V_e$ in the absence of appreciable drawing or relaxation after the second drive device, particularly during regeneration.

5. Examples

Examples of compositions according to the invention are grouped together in Table 1.

The tests comprising the preparation of regenerated cellulose fibres were performed starting from the compositions of Table 1, following the procedure described in paragraphs 3 and 4 above. The characteristic processing parameters of the fibres are given in Table 2. The properties of the fibres obtained are given in Table 3.

All these tests are according to the invention.

The abbreviations, symbols and units used in Tables 1 to 3 are as follows:

In Table 1:

| | |
|---|---|
| DMSO | dimethyl sulphoxide; |
| NMP | N-methylpyrrolidone; |
| EG | ethylene glycol; |
| DP | degree of polymerisation of the cellulose in the initial formate; |
| DS | degree of substitution of the initial cellulose formate (in %); |
| C | cellulose formate concentration in the composition (in %); |
| $DS_c$ | degree of substitution of the cellulose formate in the composition (in %); |
| $T_r$ | fusion temperature of the composition in gel form; |
| $Ar_b$ | elongation at break of the composition in gel form (in %); |
| $\sigma_b$ | breaking stress of the composition in gel form (in MPa). |

In Table 2:

| | |
|---|---|
| n | number of orifices in the spinneret: |
| D | diameter of each spinneret orifice (in $\mu$m); |
| $T_e$ | spinneret temperature (in ° C.); |
| $V_e$ | speed of emergence from the spinneret (in metres per minute); |
| $T_b$ | temperature of the zone of gelation (in ° C.); |
| $V_{a1}$ | first take-up speed (in metres per minute); |
| $V_{a2}$ | second take-up speed (in metres per minute); |
| $C_{NaOH}$ | concentration of NaOH in the regeneration bath (in % by weight); |
| $t_{reg}$ | dwell time in the regeneration bath (in seconds); |
| FEF | total drawing factor. |

In Table 3:

| | |
|---|---|
| Ti | titre (in tex); |
| T | tenacity (in cN/tex); |
| Ar | elongation at break (in %); |
| Mi | initial modulus (in cN/tex); |
| $DS_r$ | degree of substitution of the cellulose by formate groups (in %). |

COMMENTS ON THESE EXAMPLES

Under the production conditions of the compositions the degree of polymerisation of the cellulose formate in the composition is less than the degree of polymerisation in the initial cellulose formate, the maximum difference being 10%, which is very slight.

The proportions of the solvent system give the relative amounts of constituents I and II by weight.

Examples of compositions according to the invention and the properties of these compositions are given in Table 1, in the form of 10 different tests denoted by "A" to "J".

The fibres according to the invention (14 examples in total) and their processing parameters are shown in Table 2. The properties of these fibres are summarised in Table 3. All the letters used to designate a spinning composition in Table 1 also serve to designate the spun fibres from this given composition, this letter being accompanied by an index in Tables 2 and 3, namely the index "1" or the index "2" depending on whether 1 fibre (1 spinning test) or 2 fibres (2 spinning tests) were produced from the same composition. For example, a single fibre denoted by "A1" in Tables 2 and 3 was spun from the composition denoted by "A" in Table 1. Two fibres, denoted by "C1" and "C2" in Tables 2 and 3, were spun from the same composition, denoted by "C" in Table 1.

The properties of the fibres given in Table 3 are those of the final regenerated fibres. These characteristics relate either to multifilament fibres, or to monofilaments in the case of examples $C_1$ and $C_2$ on the one hand and $J_1$ and $J_2$ on the other hand.

The diameter of the monofilaments according to the invention was determined either by calculation in the known manner from the titre and the density (mean value: 1.50) or by optical or electron microscope measurements (magnification 200).

TABLE 1

Examples of composition according to the invention

| | Initial cellulose formate | | Composition | | | | | Mechanical properties of the composition in its gel phase | |
|---|---|---|---|---|---|---|---|---|---|
| | | | Solvent system | | Formate | | | | |
| Ex | DP | DS (%) | Nature (I/II) | Proportions (I/II) | C (%) | $DS_c$ (%) | $T_f$ (° C.) | $AR_g$ (%) | $\sigma_g$ (MPa) |
| A | 530 | 44 | DMSO/WATER | 80/20 | 17 | 40.6 | 81 | 70 ± 20 | 2.9 ± 1.0 |
| B | 1040 | 43 | DMSO/WATER | 80/20 | 12 | 35.2 | 91 | not | determined |
| C | 950 | 44 | DMSO/WATER | 80/20 | 10 | 30.7 | 77 | not | determined |
| D | 830 | 47 | DMSO/WATER | 80/20 | 14 | 40.0 | 84 | not | determined |
| E | 530 | 44 | DMSO/EG | 80/20 | 14 | 32.0 | 73 | 71 ± 9 | 3.3 ± 0.4 |

TABLE 1-continued

Examples of composition according to the invention

| | Initial cellulose formate | | Composition | | | | | Mechanical properties of the composition in its gel phase | |
|---|---|---|---|---|---|---|---|---|---|
| | | | Solvent system | | Formate | | | | |
| Ex | DP | DS (%) | Nature (I/II) | Proportions (I/II) | C (%) | $DS_c$ (%) | $T_f$ (° C.) | $AR_g$ (%) | $\sigma_g$ (MPa) |
| F | 560 | 45 | NMP/WATER | 80/20 | 14 | 43.0 | 68 | 90 ± 6 | 1.3 ± 0.3 |
| G | 560 | 45 | NMP/WATER | 70/30 | 14 | 36.0 | 80 | 69 ± 10 | 1.6 ± 0.5 |
| H[a] | 530 | 38 | DMSO/EG; WATER | 80/10; 10 | 14 | 36.0 | 88 | 61 ± 5 | 2.2 ± 0.3 |
| I | 530 | 43 | DMSO/WATER | 80/20 | 17 | 36.0 | 81 | 62 ± 5 | 2.0 ± 0.4 |
| J | 830 | 41 | DMSO/WATER | 80/20 | 12 | 35.0 | 70 | 77 ± 5 | 1.3 ± 0.3 |

[a]: Constituent II is formed from a mixture of water and ethylene glycol in identical relative proportions.
DMSO: dimethyl sulphoxide; EG: ethylene glycol; NMP: N-methylpyrrolidone

TABLE 2

Characteristic processing parameters of fibres according to the invention

| | | | Spinning | | | | | | Regeneration | | |
|---|---|---|---|---|---|---|---|---|---|---|---|
| Ex | n | D (μm) | $T_c$ (° C.) | $V_c$ (m/min) | Gelling zone | $T_b$ (° C.) | $V_{a1}$ (m/min) | $V_{a2}$ (m/min) | $C_{NaOH}$ (%) | $t_{reg}$ (s) | FEF |
| A1 | 26 | 50 | 110 | 44.0 | methanol | −15 | 60.0 | 63.0 | 1 | 180 | 1.4 |
| B1 | 100 | 100 | 100 | 19.5 | methanol | −16 | 23.2 | 25.0 | 3 | 45 | 1.4 |
| C1 | 1 | 800 | 120 | 11.6 | methanol | −18 | 11.6 | 12.0 | 5 | 60 | 1.3 |
| C2 | 1 | 800 | 120 | 11.6 | methanol | −18 | 6.0 | 8.0 | 5 | 60 | 0.7 |
| D1 | 100 | 100 | 110 | 33.2 | water | +4 | 18.0 | 18.0 | 3 | 120 | 0.8 |
| E1 | 100 | 50 | 100 | 46.0 | methanol | −15 | 60.0 | 63.0 | 1 | 300 | 1.4 |
| F1 | 26 | 50 | 110 | 44.0 | methanol | −15 | 60.0 | 63.0 | 1 | 120 | 1.5 |
| F2 | 26 | 50 | 110 | 88.0 | methanol | −15 | 100.0 | 100.0 | 1 | 120 | 1.1 |
| G1 | 26 | 50 | 100 | 176.0 | methanol | −15 | 100.0 | 100.0 | 1 | 120 | 0.6 |
| G2 | 26 | 50 | 100 | 88.0 | methanol | −15 | 100.0 | 100.0 | 1 | 120 | 1.2 |
| H1 | 26 | 50 | 110 | 88.0 | methanol | −15 | 100.0 | 100.0 | 5 | 6 | 1.1 |
| I1 | 26 | 50 | 100 | 65.0 | water | +16 | 60.0 | 60.0 | 3 | 40 | 0.9 |
| J1 | 1 | 300 | 110 | 120.0 | heptane | −20 | 40.0 | 47.0 | 5 | 300 | 0.4 |
| J2 | 1 | 300 | 110 | 27.0 | water | +16 | 60.0 | 60.0 | 5 | 300 | 2.2 |

TABLE 3

Properties of the fibres according to the invention

| Ex | Ti (tex) | T (cN/tex) | Ar (%) | Mi (cN/tex) | $DS_r$ (%) |
|---|---|---|---|---|---|
| A1 | 5.9 | 21.6 | 13.8 | 875 | 0.1 |
| B1 | 61.1 | 28.0 | 10.3 | 1080 | 3.4 |
| C1[a] | 35.2 | 21.2 | 19.0 | 960 | 2.8 |
| C2[b] | 71.6 | 20.9 | 16.2 | 950 | 3.1 |
| D1 | 127.0 | 29.4 | 6.4 | 1210 | 0.4 |
| E1 | 18.5 | 20.6 | 7.1 | 1130 | 0.3 |
| F1 | 4.7 | 22.6 | 11.1 | 980 | 2.6 |
| F2 | 5.5 | 22.3 | 9.1 | 910 | 1.4 |
| G1 | 10.9 | 23.5 | 10.3 | 870 | 3.3 |
| G2 | 5.5 | 25.6 | 5.9 | 1165 | 1.6 |
| H1 | 5.9 | 23.1 | 12.5 | 1220 | 1.2 |
| I1 | 8.3 | 19.8 | 13.2 | 930 | 0.1 |
| J1[c] | 21.0 | 18.2 | 19.6 | 920 | 0.2 |
| J2[d] | 3.5 | 16.3 | 12.5 | 900 | 3.0 |

[a]: monofilament of diameter 170μ
[b]: monofilament of diameter 370μ
[c]: monofilament of diameter 130μ
[d]: monofilament of diameter 50μ

As shown by the preceding examples, the use of formic acid and phosphoric acid during the production of the cellulose formate enables a high degree of substitution by cellulose formate, which is greater than 30%, to be obtained, without an excessive decrease in the initial degree of polymerisation of the cellulose.

Moreover, the possibility of forming the derivative in solution, i.e. in situ (formylation and dissolution of the cellulose in the same solvent mixture) at the same time enables a homogeneous distribution to be obtained between the formate groups both in the amorphous zones and in the crystalline zones of the cellulose formate.

Other processes for obtaining cellulose formate are possible, these processes preferably being carried out in solution in order to obtain this homogeneous distribution of formate groups.

As shown in Table 1, the degree of substitution of the cellulose formate may be less in the composition than the value which it had in the initial formate, i.e. in the formate before producing the composition. For this reason, production conditions according to the invention are preferred which enable a value of $DS_c$ which is at least equal to 25% to be obtained in these compositions.

The thermoreversible gel obtained by thermal quenching of the compositions according to the invention is elastic, as shown in detail in Examples A, E, F, G, H, I and J and by the typical gel tensile force-elongation curves in the FIGURE, which correspond to Examples A (curve C1), E (curve C2) and G (curve C3), where the abscissa corresponds to the elongation (ε) in % and the ordinate corresponds to the force (F) in newtons.

When they are examined as indicated in paragraph 3.3 of Section I above, the filaments of the fibres obtained according to the invention exhibit a morphology in cross-section (in a direction normal to the axis of the filament) which is practically continuous from the periphery up to the core of the filament, analogous to that observed for the fibres described in the aforementioned patent application WO-A-94/17136. The expression "morphology which is practically continuous from the periphery up to the core" is to be understood to mean that the filaments exhibit good lateral cohesion, and in particular do not comprise a layer morphology such as that described, for example, in patent application WO-A-85/05115 for anisotropic spinning compositions, a layer morphology such as this being characterised by a succession of numerous concentric layers surrounding the axis of the filaments, which layers are enclosed within each other and are linked together by relatively weak cohesive forces.

The fibres according to the invention were subjected to the water fibrillation test as described in paragraph 3.4 of Section I. Fibres according to the aforementioned patent applications WO-A-85/05115 and WO-A-94/17136 were tested for comparison. The fibres according to the first patent application WO-A-85/05115 responded to the test by a pronounced, clearly marked fibrillation. Compared with these latter fibres, the fibres according to the second patent application, WO-A-94/17136, exhibited a clearly improved resistance to fibrillation. However, the presence of a certain number of fibrils on the surface of the fibres tested showed that fibrillation was not negligible.

Only the fibres according to the present invention exhibit, at the end of the test, a surface condition of the filaments which is practically not changed. In particular, the presence of fibrils was not detected on the surface of the filaments. Thus, on the fibrillation scale (fibrillation scores varying from 0 to 6) described in the aforementioned document by Marini et al. (see paragraph 3.4, Section I) the fibrillation score would be equal to zero (no fibrillation), or would be less than 1 in all cases, a score equal to 1 representing very slight fibrillation, as illustrated in FIG. 5 of the aforementioned document by Marini, for example.

In this sense it must be concluded that the filaments of the fibres according to the invention do not fibrillate, or practically do not.

As a consequence, the fibres according to the invention have quite an improved resistance to fibrillation compared with the cellulose fibres described in the aforementioned patent applications WO-A-85/05115 and WO-A-94/17136, which are themselves obtained from cellulose formate.

It is known that resistance to fibrillation is a property which is particularly sought after in the field of cellulose textile fibres, particularly during the various finishing steps of the fibres or of the textiles produced from these fibres (see Melliand Textilberichte, 10/93, pp. 945–956, for example).

In summary, due to the novel and quite unexpected characteristic of the composition of the invention, namely its character of an elastic and thermoreversible gel, a coagulation step is no longer necessary in order to obtain cellulose fibres by spinning. This coagulation step is replaced here by a step of gelation which can be conducted without the extraction, or without noticeable extraction, of the solvent system. A cellulose fibre can thus be obtained by gel spinning which consists of filaments exhibiting a morphology which is practically continuous in the transverse direction and very good lateral cohesion. Moreover, these filaments do not fibrillate or practically do not when they are subjected to the water fibrillation test as described previously.

Another advantage of the invention is that this gelling step enables the shape of the cross-section of the filaments of the fibres of the invention to be modulated very widely, as a function of the experimental conditions selected for spinning (with particular emphasis on the temperature of gelation, the nature of the medium of gelation and the shape of the extrusion capillaries of the spinneret). It is thus possible to obtain either filaments having a very regular cross-section and exhibiting clean, precise linear contours (excellent circularity, for example), or, in contrast, filaments having cross-sections with strongly undulating contours, for example crenellated contours. In particular, modulation such as this enables the visual appearance of the fibres or of textile fabrics produced from these fibres to be modified.

The filaments, particularly the monofilaments, according to the invention may have any cross-section, of circular or oval shape for example. If the cross-section is not circular, the term "diameter" then means the smallest dimension of this cross-section.

The composition according to the invention preferably has at least one of the following characteristics:
  the concentration of cellulose formate is at least equal to 4% by weight;
  the degree of substitution of the cellulose by formate groups is at least equal to 25%;
  the degree of polymerisation of the cellulose in the formate is at least equal to 200;

The composition according to the invention advantageously has at least one of the following characteristics:
  the concentration of cellulose formate is at least equal to 8% by weight;
  the degree of substitution of the cellulose by formate groups is at least equal to 30%;
  the degree of polymerisation of the cellulose in the formate is at least equal to 500;
  the relative amount of constituent(s) (II) in the solvent system is at least equal to 15% by weight, and more advantageously is at least equal to 20%.

The fusion temperature of the gel, $T_f$, is preferably greater than 50° C.

In particular, the process according to the invention has the following advantages:
  it is non-polluting under its conditions of use when compared with the viscose or rayon processes;
  the process can be used to produce fibres, the titre and the mechanical properties of which (tenacity, initial modulus, elongation at break) can be varied to a large extent, particularly by varying the degree of polymerisation of the cellulose, the cellulose formate concentration in the spinning composition and the drawing factor during the various processing steps of the fibre. In this manner, for example, it enables monofilaments of high titre to be obtained which have mechanical properties comparable with those of known cellulose multifilaments;
  it is economical, because it enables spinning solutions to be employed which are more concentrated than those which are used in the known production processes for viscose fibres or rayon fibres.

The fibre according to the invention preferably has at least one of the following characteristics:
  its tenacity is at least equal to 20 cN/tex;
  its elongation at break is at least equal to 10% and is advantageously at least equal to 15%.

The monofilament fibre according to the invention preferably has a diameter at least equal to 100 micrometers and a titre at least equal to 11.5 tex.

The invention is of not course limited to the embodiments described above.

Thus the composition according to the invention can be used to produce films, for example by employing a technique comprising pouring on to a cooled drum or by employing an extrusion technique comprising its passage into a space containing a non-coagulant fluid on emergence from the spinneret.

Due to its novel and unexpected properties, the composition according to the invention may ultimately assume a large number of forms possible in the liquid state, and then, after thermal quenching, may be transformed into an intermediate article of given form, made of cellulose formate gel, wherein the present invention also relates to an article such as this. This intermediate article will subsequently be regenerated to provide a finished article made of regenerated cellulose.

Apart from an extrusion operation, the first step of transformation of the composition in accordance with the process according to the invention may be an operation comprising moulding, casting, pressing, pulverisation, or, more generally, may comprise any precise and specific shaping operation on the composition in the liquid state, before employing the subsequent step of gelation by thermal quenching.

The compositions according to the invention may thus be used to produce, by means of the process according to the invention, all types of articles made of regenerated cellulose other than fibres or films, for example particles or microparticles of spherical or quasi-spherical shape.

Alternatively, different constituents may optionally be added to the cellulose formate or to the solvent system before, during or after the dissolution of the formate, without the spirit of the invention being modified. Such constituents, when present, are in a minor proportion, the sum of their parts by weight in the composition preferably being less than 10%, most preferably less than 5%.

By way of example, these additional constituents may be salts, for example halides of alkali or alkaline earth metals, plasticisers, polymers capable of dissolving with the cellulose, surfactants, various additives or fillers which enable the transformation and the implementation of the compositions of the invention to be improved, for example their spinning capacity, their drawing capacity, or which enable the properties of the articles obtained, for example the fibres or films, to be improved, such as their mechanical properties, their endurance properties, or their adhesiveness to a rubber matrix.

Furthermore, the term "cellulose formate" covers those cases where the alcohol groups of the cellulose are substituted by groups other than formate groups, in addition to the latter, for example by ester groups, particularly acetate groups, the degree of substitution of the cellulose by these other groups preferably being less than 10%.

We claim:

1. A process for preparing a regenerated cellulose article comprising the steps of:
    a) transforming a cellulose formate composition comprising a solvent system, said composition characterized by the following features:
        (i) at ambient temperature, said composition forms a solid in the form of an elastic thermoreversible and fusible gel;
        (ii) at a temperature at least equal to a gel fusion temperature noted $T_f$, greater than 50° C., said composition forms a liquid in the form of a spinnable solution, into a liquid object having the shape of a desired article, at a temperature such that the composition is a solution;
    b) subjecting said liquid object to thermal quenching by rapid cooling of the solution in a medium of gelation, the temperature of which is appreciably less than $T_f$, so as to obtain an elastic, thermoreversible gel;
    c) washing the article in the form of the said gel to remove the whole or the major part of the solvent system;
    d) regenerating the cellulose of the article in an alkaline solution in order to obtain a regenerated cellulose article; and
    e) washing and drying the article.

2. A process according to claim 1, characterised in that the temperature of the medium of gelation is less than −10° C.

3. A process according to claim 1, wherein that during step a) the composition is transformed into a liquid object having the shape of a fibre or a film.

4. A process according to claim 3, characterised in that it is a spinning process according to the so-called "dry-jet-wet" technique.

5. A process according to claim 4, characterised in that the medium of gelation is a liquid which is immiscible or quasi-immiscible with the solvent system.

6. A process according to claim 1 wherein the cellulose formate composition comprises (I) at least one aprotic solvent capable of dissolving said cellulose formate, and (II) at least one non-solvent for said cellulose formate, the total amount of non-solvent (II) being in the range of 10 to 40% by weight of the total amount of solvent (I) and non solvent (II).

7. A process according to claim 6 wherein the aprotic solvent constituent of group (I) is selected from the group consisting of alkyl sulphoxides, lactams, acyclic amides, and cyclic derivatives of urea having a methyl substituent on the nitrogen, wherein the lactams and acyclic amides may be substituted or unsubstituted, and the non-solvent constituent of group (II) is selected from the group consisting of water and alcohols.

8. A process according to claim 7 wherein the aprotic solvent constituent is dimethyl sulfoxide.

9. A process according to claim 7 wherein the alcohols of group (II) are selected from the group consisting of ethylene glycol, propylene glycol and glycerol.

10. A process according to claim 1 wherein the concentration of cellulose formate in the composition is at least equal to 4% by weight.

11. A process according to claim 10 wherein the concentration of cellulose formate is at least equal to 8% by weight.

12. A process according to claim 1 wherein the degree of substitution of the cellulose by formate groups in the composition is at least equal to 25%.

13. A process according to claim 12 wherein the degree of substitution of the cellulose by formate groups is at least equal to 30%.

14. A process according to claim 1 wherein the degree of polymerization of the cellulose in the composition is at least equal to 200.

15. A process according to claim 14 where in the degree of polymerization of the cellulose is at least equal to 500.

16. A process according to claim 6 wherein the relative amount of constituent(s) (II) in the solvent system is at least equal to 15% by weight.

17. A process according to claim 16 wherein the relative amount of constituent(s) (II) in the solvent system is at least equal to 20% by weight.

* * * * *

UNITED STATES PATENT AND TRADEMARK OFFICE
CERTIFICATE OF CORRECTION

PATENT NO. : 6,123,887
DATED : September 26, 2000
INVENTOR(S) : Huston et al.

It is certified that error appears in the above-identified patent and that said Letters Patent is hereby corrected as shown below:

Column 4,
Lines 14 and 17, "[π]" should read -- [η] --
Line 61, "wail" should read -- wall --

Column 7,
Line 60, "an" should read -- a --

Column 11,
Line 32, "$Ar_\delta$" should read -- $Ar_g$ --
Line 33, "$\delta_\delta$" should read -- $\delta_g$ --

Column 12,
Line 8, "$DS_r$" should read -- $DS_f$ --
Table 1, "$AR_g$" should read -- $Ar_g$ --

Column 13,
Table 1, "$AR_g$" should read -- $Ar_g$ --
Table 3, "Properiies" should read -- Properties --

Column 18,
Line 17, "that" should be deleted
Line 30, "non solvent" should read -- non-solvent --

Signed and Sealed this

Nineteenth Day of March, 2002

JAMES E. ROGAN
Director of the United States Patent and Trademark Office